Jan. 31, 1933.  A. D'HALLOY  1,895,845
SCREW STUD LOCKING DEVICE
Filed Nov. 3, 1930
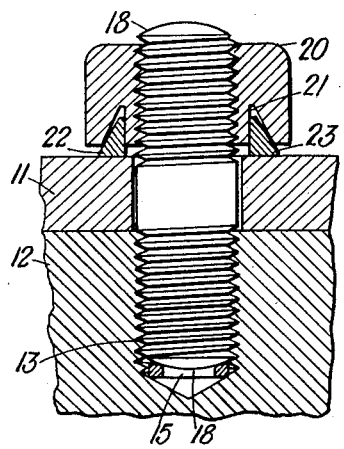
FIG.1.
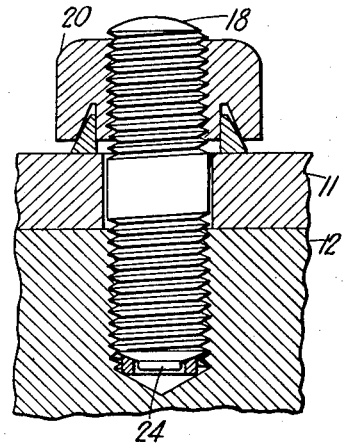
FIG.2.
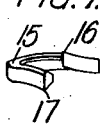
FIG.6.
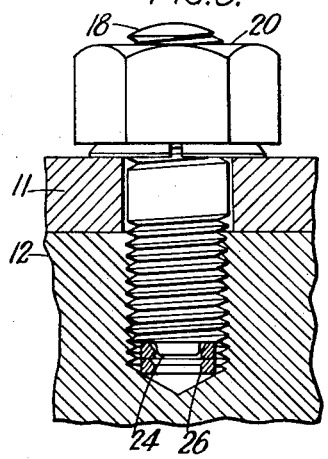
FIG.3.
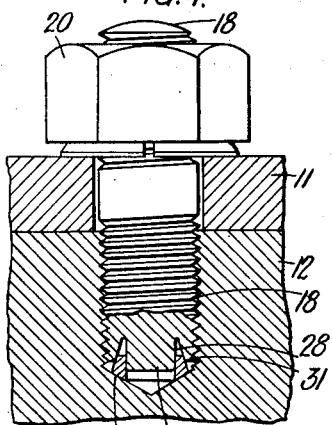
FIG.4.
FIG.7.
FIG.8.
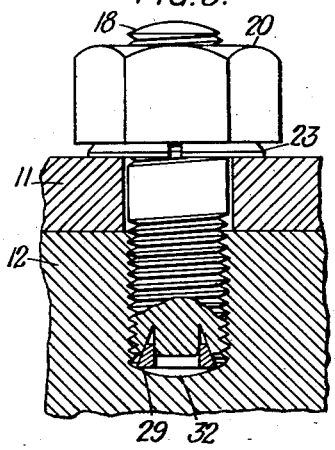
FIG.5.
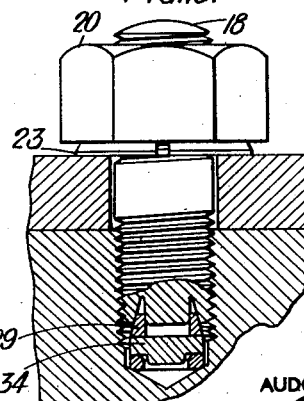
FIG.10.
FIG.9.
INVENTOR
AUDOIN D'HALLOY
BY R.C. Hopgood
ATTORNEY Patented Jan. 31, 1933

1,895,845

UNITED STATES PATENT OFFICE

AUDOIN D'HALLOY, OF PARIS, FRANCE, ASSIGNOR TO INTERNATIONAL SAFETY LOCK NUT CORPORATION, OF NEW YORK, N. Y.

SCREW STUD LOCKING DEVICE

Application filed November 3, 1930, Serial No. 493,198, and in Great Britain February 6, 1930.

This invention relates to means for securing together elements of machines or structures by means employing a screw stud and concerns particularly a simple and effective device whereby the accidental unscrewing of the stud may be prevented.

The term "stud" herein employed is not used in any limited sense, but is intended to include a screwed pin or any other equivalent device to a screw stud.

Various forms of locking devices have previously been proposed whereby accidental unscrewing of a nut upon a bolt, stud, or the like, may be prevented, a particularly effective lock nut arrangement having been described in the specification of my prior application Serial No. 211,236 filed August 6th, 1927. Such devices may be effective to hold together elements of construction which in practice are subjected to vibration when a nut and bolt device is employed. However, in some instances it is not possible or convenient to employ such nut and bolt devices for securing together the elements of construction; for example, in the case of internal combustion engines it is usually necessary to employ screw studs for securing the cylinder head to the body of the cylinder and also for securing the cylinder to the crank case. For such applications it is necessary not only to provide a nut lock device for securing the nut against rotation, but also to prevent rotation of the stud, for which purpose it has been customary to insert a grub screw, pin, key or similar device between the stud and element into which it is screwed, in order to prevent the rotation of the stud when the parts are subjected to vibration, or during unscrewing of the nut.

An object of the present invention is to provide an improved locking device of a simple character for securing a screw stud in the element in which it is screwed, this being effected by the aid of a simple washer of the well-known Grover type which is inserted into the screw-threaded recess before the insertion of the stud, the form of the washer before its insertion into the recess being substantially helical in an opposite sense to the thread of the stud. When the stud is tightened upon the washer the latter is compressed axially, one extremity thereof being pressed against the adjacent end face of the stud while the other extremity is firmly pressed against the bottom of the recess. Any tendency for the stud to rotate in the direction of unscrewing is strongly opposed by the washer, the ends of which will become embedded in the adjacent surfaces of the recess and the stud respectively. The end of the stud is preferably shaped so as to locate the washer centrally in the recess.

A further object of the invention is to provide a locking device comprising a screw stud provided with a Grover type washer helical in the opposite sense to the thread of the stud and of smaller external diameter than the root diameter of the stud, associated with a nut preferably of the character set forth in my prior specification above referred to.

A further object of the invention is the provision of a screw stud and means for securing same in a threaded recess in an element of construction, the screw stud being formed with an annular groove of substantially wedge-shaped cross section formed in the end surface thereof and a resilient split washer also of wedge-shaped cross section adapted to be partially engaged within said annular recess when axially compressed between the end of the stud and bottom of the threaded recess in which the stud is inserted.

These and other objects and features of the invention will be apparent from the following description with reference to the accompany drawing and are more particularly pointed out in the claims appended hereto.

In the drawing, Figure 1 represents a cross section of a fragment of two elements of construction held together by a screw locking device according to the invention, the section being taken substantially in the vertical axis of the stud, which latter is shown in full elevation; Figure 2 is a view similar to Figure 1 showing a modified form which the invention may take, and Figures 3, 4 and 5 show further modified constructions the nut and the locking washer thereof being shown in full elevation in these figures; Figure 6 is a perspective view of the stud locking washer employed in Figure 2; Figure 7 is an elevation of the washer shown in Figure 6; Figures 8 and 9 are views in perspective of the stud locking washers employed in the constructions shown in Figures 3 and 4, and Figure 10 is a view, similar to Figures 3, 4 and 5, showing a further modified form which the invention may take.

Like reference numerals are employed to indicate corresponding parts in all the figures.

Referring more specifically to the drawing, Figure 1 shows fragments of two elements of construction 11, 12 which it is required to secure together by the aid of a screw stud. For this purpose the element 12 is provided with a screw-threaded recess 13 by boring to an appropriate depth and tapping in the usual manner, while the element 11 is bored with an aperture 14 of a size suited to that of the stud to be used and the margin of clearance to be permitted. A split spring washer 15, (Figs. 1, 6 and 7), the external diameter of which is somewhat less than the root diameter of the stud, is placed in recess 13 before the stud is screwed into said recess.

As shown more clearly in Figs. 6 and 7 the washer 15, before its insertion into the recess is substantially helical in an opposite sense to the thread of the stud. The washer may therefore be said to be of the Grover type, well-known in the art. The extremities 16, 17 of the washer 15 are preferably formed at an acute angle as shown more clearly in Fig. 7. Upon screwing the stud 18 into the recess 13 in the element 12, the washer 15 is compressed axially, the upper extremity thereof pressing against the end surface 18 of the stud, and the lower extremity of the washer similarly pressing against the bottom of the recess 13.

When the stud 18 is screwed tight, the washer 15 is securely clamped between the lower surface 18 of the stud and the bottom of the recess 13 and therefore serves to maintain a resilient axial pressure upon the stud at all times irrespective of the vibrations to which the parts may be subjected in use. Moreover, the two extremities of the washer will tend to bed themselves into the end surface of the stud and the bottom of the recess respectively and will therefore also resiliently provide a tangential force strongly opposing any tendency of the stud to rotate in the direction of unscrewing.

By the use of a lock nut of the character described in my aforesaid prior specification in combination with the stud locked against accidental unscrewing as described above, two elements of construction may be held together in an extremely effective manner. As shown in Fig. 1 a preferred form of nut 20 has an annular groove 21 of substantially wedge-shaped cross section formed in its end face. The skirt or sleeve portion 22 of the nut is preferably slotted to render it capable of resilient contraction, and a Grover type washer 23, also of wedge-shaped cross section, partially engaged within the groove 21 when the nut is tightened.

With this lock device a resilient axial pressure upon the nut, as well as a resilient radially applied clamping pressure of the nut upon the stud, is constantly maintained irrespective of vibration to which the parts may be subjected in practice.

As shown more particularly in Figs. 2 and 3 the stud 18 is preferably formed upon the end which screws into the recess 13, with a projection 24 of reduced diameter adapted to enter into the hollow centre of the washer and thereby locate the same centrally in the recess 13 and co-axially with the stud when the latter is screwed into position.

If desired a plurality of Grover type washers may be employed instead of a single washer 15, or a washer having more than one helical turn may be used, for example, as shown at 26, Figs. 3 and 8.

The projection 24 upon the end of the stud may be shaped to fit snugly within the washer, as for example in the construction shown in Fig. 3, while the washer may also be shaped by bevelling its inner periphery as indicated at 27 to facilitate the entry of the projection 24 therein.

In the construction shown in Figs. 4 and 5 the stud 18 is secured in a similar manner to the nut 20. The stud is formed in its end face with an annular groove 28 preferably of wedge-shaped cross section, and a Grover type washer 29 is provided also wedge-shaped in cross section and of such dimensions as partially to enter the groove 28 when the stud is tightened down. Since the central projecting portion 30 of the stud surrounded by the annular groove 28 is substantially non-compressible, the outer peripheral portion 31 of the stud which is preferably split or slotted in a similar manner to the portion 22 of the nut is pressed outwardly by the washer 29, thereby exerting upon the surrounding wall of the recess 13 a heavy pressure which is resiliently maintained by reason of the axial resilience of the washer 29.

The washer 29 shown in Fig. 4 has been shaped at its lower surface to suit the conical form of the bottom of the recess 13. Such a form of washer is not essential, however. The washer may be flat upon its lower surface, as is the case with the washer 29 shown in Figs. 5 and 9. While it is not essential, it may in some cases be desirable after drilling the recess 13 to flatten the bottom surface thereof as shown at 32 Fig. 5, this being done by a suitable facing cutter in accordance with well-known practice.

In some cases it may be preferred to terminate the full thread of the recess 13 somewhat short of the bottom thereof. In such event a spacing member 34 may be placed in the recess before the insertion of the stud 18, as illustrated in Fig. 10, with or without the interposition of a spring washer 35, the form of which may advantageously be similar to that of the washer 15 hereinbefore referred to. When a washer 35 is to be used, the spacing member 34 is preferably formed with a projecting portion 36 adapted to enter into and centrally locate the washer. The essential function of the washer 35 is to lock the member 37 against rotation. After the spacing member and the washer there beneath have been placed in the recess, the stud is applied. The stud may be formed as shown in any of Figs. 1 to 5, a corresponding washer being positioned between the stud and the spacing member 34.

In the example shown in Fig. 10 the stud and washer are of similar form to stud 18 and washer 29 shown in Figs. 5 and 9, and are therefore indicated with like reference numerals. The stud locking action of the washer 29 is just the same as previously described, the upper surface 37 of the spacing member 34 (Fig. 10) being substantially equivalent to the bottom surface 32 of the recess in Fig. 5, since the member 36 is locked against rotation by the washer 35.

From the foregoing it will be apparent that the invention provides a simple and effective device for use in securing together constructional elements by the use of screw studs. While in the above description with reference to the drawing an element of construction 11 has been shown secured to an element of construction 12 by means of a stud and nut device, it will be apparent that the invention also has application to constructions in which an element such as 11 may itself be screw-threaded and screwed on to the stud, in which case the use of a separate nut member may be dispensed with.

The device is particularly advantageous for use in mounting cylinders or other parts of internal combustion engines, and especially of aero engines of the rotary type. The studs employed according to the invention may be shorter than those hitherto considered desirable, thereby effecting a saving in material and weight, while furthermore since no external locking wires or pins are necessary a noticeable saving in windage losses or air friction occasioned by such parts may be effected.

While in the drawing the screw stud locking device, according to the invention has been shown in conjunction with a locknut device according to my prior application above referred to, it will be apparent that, although this combination is generally to be preferred, the invention in its broadest aspect is in no way limited thereto but may be employed in conjunction with other forms of locknuts or with ordinary nuts and in fact may be applied to screw studs or the like with or without nuts or heads of any kind.

Thus, while in the above description I have described certain preferred embodiments of my invention it will be understood that it is not so limited, but may be susceptible to various changes and modifications as will be readily apparent to those skilled in the art, and I desire that only such limitations shall be imposed thereon as are warranted by the prior art or specifically set forth in the appended claims.

What is claimed is:

1. In an element of construction having a recess internally screw-threaded, a screw stud having one end screwed into said recess, a projection of reduced diameter on the end of the stud, and a split spring washer disposed around said projection between and cooperating with the end of the stud and the bottom of the screw-threaded recess to lock the stud within the recess.

2. In an element of construction having a recess internally screw-threaded, a screw stud having one end screwed into said recess, a projection of reduced diameter on the end of the stud, and a split spring washer disposed around said projection between the end of the stud and the bottom of the screw-threaded recess, said spring washer before its insertion into the recess being substantially helical in a contrary sense to the thread of the stud.

3. In an element of construction having a recess internally screw-threaded, a screw stud having one end screwed into said recess and formed in its end surface with an annular groove spaced from the periphery of the stud, and a split spring washer located between the said stud and the bottom of the screw-threaded recess and partially engaged within said groove.

4. In an element of construction having a recess internally screw-threaded, a screw stud having one end screwed into said recess and formed in its end surface with an annular groove of substantially wedge-shaped cross sectional form, and a split spring washer located between the said stud and the bottom of the screw-threaded recess and partially engaged within said groove, said spring washer before its insertion into the recess being substantially helical in a contrary sense to the thread of the stud.

5. In an element of construction having a recess internally screw-threaded, a screw stud having one end screwed into said recess, a spacing member disposed between the end of said stud and the bottom of said screw-threaded recess, a Grover type washer located between the end of said stud and said spacing member, and a second Grover type washer located between said spacing member and the bottom of said recess.

6. In an element of construction having a recess internally screw-threaded, a screw stud having one end screwed into said recess, a projection of reduced diameter on the end of said stud, a spacing member disposed between the end of said stud and the bottom of the screw-threaded recess, a split spring washer disposed around said projection between the end of the stud and the spacing member, and means located between the said spacing member and the bottom of the screw-threaded recess.

7. In an element of construction having a recess internally screw-threaded, a screw stud having one end screwed into said recess, a projection of reduced diameter on the end of said stud, a spacing member disposed between the end of the stud and the bottom of the recess, a Grover type washer disposed around said projection between the end of the stud and the spacing member, and a second Grover type washer located between said spacing member and the bottom of said recess.

8. In an element of construction having a recess internally screw-threaded, a screw stud having one end screwed into said recess and formed in its end surface with an annular groove, a spacing member disposed between the end of said stud and the bottom of the recess, a split spring washer located between said stud and said spacing member, and means for locking said spacing member against rotation in said recess.

9. In an element of construction having a recess internally screw-threaded, a screw stud having one end screwed into said recess, and formed in its end surface with an annular groove of substantially wedge-shaped cross sectional form, a spacing member located between the stud and the bottom of said recess, a Grover type washer located between said stud and spacing member and partially engaged within said groove, and a second Grover type washer disposed between said spacing member and the bottom of said recess.

In witness whereof I hereunto subscribe my name this 10th day of October, 1930.

AUDOIN D'HALLOY.